April 28, 1931.　　　　S. G. HOYT　　　　1,802,426
DRAIN PAN
Filed June 3, 1930　　2 Sheets-Sheet 1
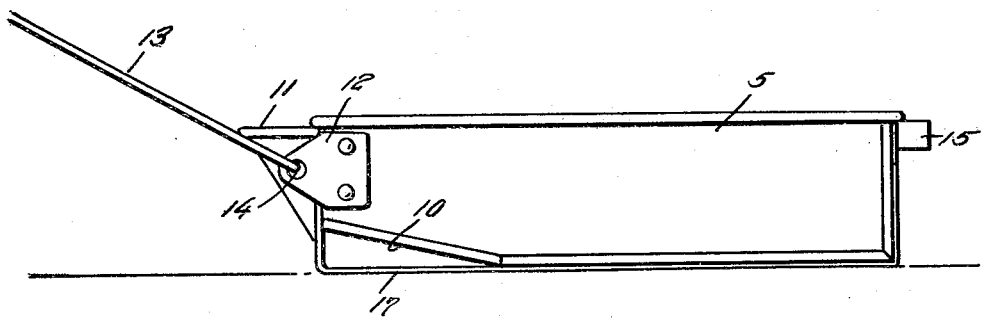
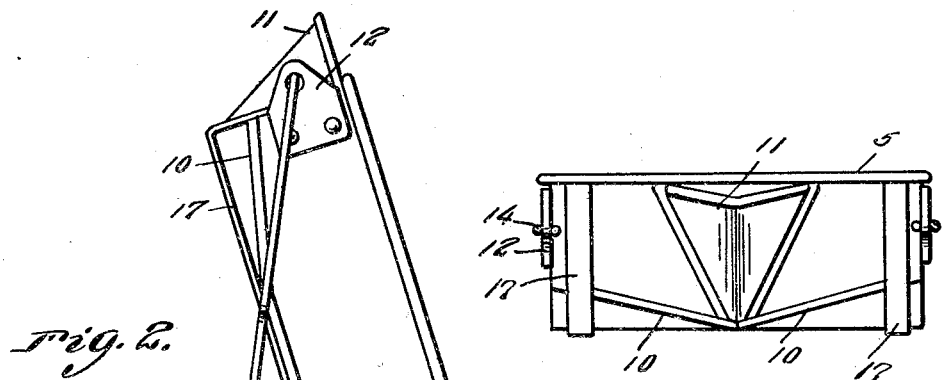
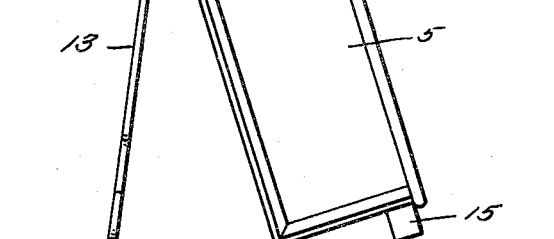
Inventor
S. G. Hoyt
By Clarence A. O'Brien
Attorney April 28, 1931.  S. G. HOYT  1,802,426
DRAIN PAN
Filed June 3, 1930   2 Sheets-Sheet 2
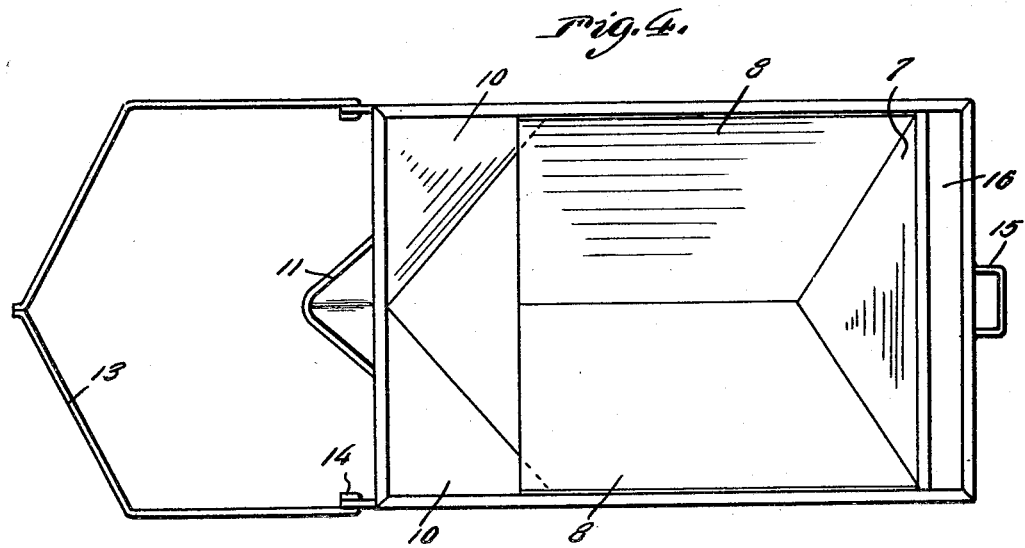
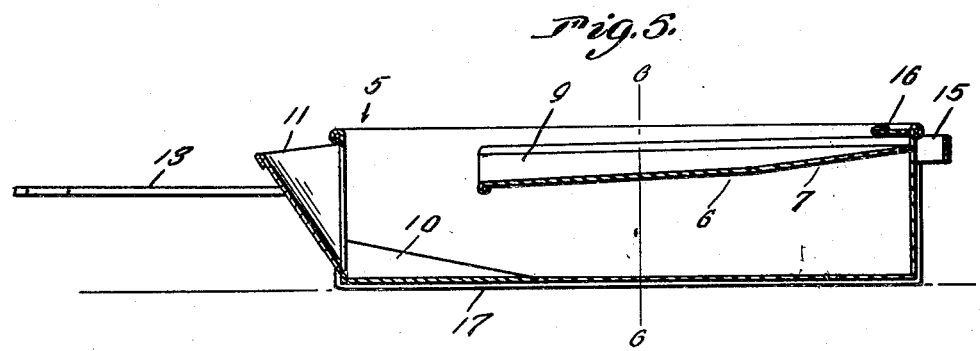
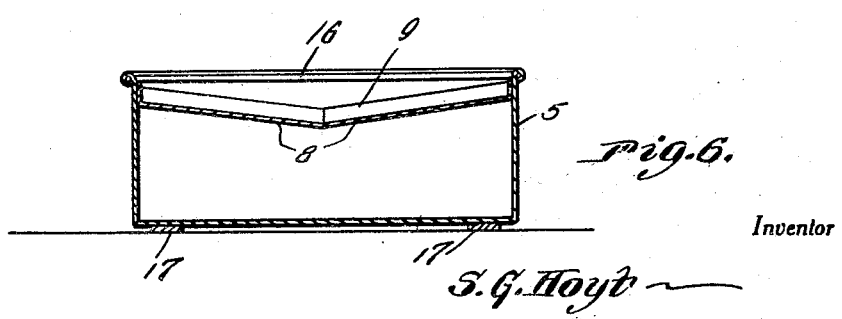
Inventor
S. G. Hoyt
By Clarence A. O'Brien
Attorney Patented Apr. 28, 1931

1,802,426

UNITED STATES PATENT OFFICE

SENECA G. HOYT, OF FRANKLIN, NEW HAMPSHIRE

DRAIN PAN

Application filed June 3, 1930. Serial No. 459,065.

The purpose of the present invention is to provide a receptacle particularly adapted for testing oils drained from the engine of motor vehicles, such as from the crank case of the engine, or from any part of the automobile or to catch the oil drained from any type of machinery which at times requires the draining of oil.

A still further object of the invention is to provide a pan adapted for the purpose above mentioned, and provided with a handle whereby the pan may be readily set up in an upright position, and the handle arranged to act as a leg or prop for the pan or receptacle in the upright position.

A still further object of the invention is to provide a receptacle of the above mentioned character which character can be readily and easily pushed under, or pulled from under an automobile or machinery for catching the oil drained therefrom.

A still further object of the invention is to provide a drain pan of the character above mentioned which when filled with liquid substance may be readily emptied into a barrel or container.

Still another object of the invention is to provide a pan of this character provided with a flange at one end thereof overlapping a portion of the top of the pan whereby to prevent liquid substance that may have accummulated on the top of the pan from dripping on to the floor when the pan is in an upright position.

A still further object of the invention is to provide a drip pan provided with runners extending lengthwise of its bottom to eliminate wear on the bottom of the pan when the latter is dragged over cement, concrete, wood floors or any other hard surface.

A still further object of the invention is to provide a drain pan formed at the forward corners thereof so as to provide a suitable liquid conducting surface for conducting the liquid to the drain spout of the pan to reduce the possibility of the liquid from running over the sides of the pan when emptying the pan.

Other objects and advantages of the invention will become apparent during a study of the following description, taken in connection with the accompanying drawings, wherein:

Figure 1 is a side elevation of my improved pan showing the same resting flat upon a surface, Figure 2 is a similar view showing the pan in an upright position and supported by the handle of the pan, Figure 3 is a forward end elevation of the pan, Figure 4 is a top plan view thereof, Figure 5 is a longitudinal vertical sectional view therethrough, Figure 6 is a transverse sectional view taken substantially on the line 6—6 of Figure 5.

With reference in detail to the drawings, it will be seen that a pan designated generally by the reference character 5 is preferably formed of metal and is of elongated rectangular configuration. The pan is partially covered or closed at the top thereof by an inclined top plate extending from the rear end thereof between the side walls of the pan to terminate at its forward free end adjacent, but in spaced relation to the forward end wall of the pan.

The top 6 slopes downwardly and forwardly from its rear end to a point rearwardly of its forward end, said top 6 also inclining downwardly from opposite longitudinal sides thereof to its longitudinal center as at 8. The top 6 is further provided along the side and rear edges thereof with an upstanding flange 9 adapted to be welded or otherwise secured to the side and end walls of the pan 5.

Further, the pan at the forward corners thereof is beveled or otherwise formed to provide a pair of bottom corner sections 10—10 inclining forwardly and upwardly in the manner clearly suggested to provide suitably inclined surfaces for directing the oil or contents of the pan toward the discharge spout 11 at the forward end of the pan.

Suitably secured to the side walls of the pan at the forward end thereof are plates 12 and a substantially U-shaped handle or bail 13 has the ends of its legs suitably and pivotally connected to the forward ends of the plates 12 as at 14. Obviously the bail or handle 13 will facilitate pushing the pan under, or from under the engine of an automobile or any other type of engine for catching oil dripping therefrom.

As shown to advantage in Figure 2, the pan 5 when filled with oil will be disposed in a substantially upright position or in that position suggested in Figure 2, the handle 13 being swung downwardly so that the free end portion of the handle rests on the ground and thus provides a leg or prop for the pan in this position.

Furthermore at its rear wall the pan is provided with a suitable handle 15 rigidly secured to the pan and provides a leg for the end wall of the pan so that the pan will be retained in a more or less tilted position as shown in Figure 2.

At the rear end of the pan, and projecting inwardly from the upper edge of the wall thereof is a flange 16 extending transversely of the flange in spaced relation to the adjacent end of the top 6 and forming with said top 6 a trough for receiving any oil that may have accumulated on the top 6 when the pan is in the inclined position shown in Figure 2 as is apparent, thus preventing any oil dripping from the top 6 on to the floor when the pan is in the position referred to.

Extending longitudinally of the pan in spaced parallel relation is a pair of runners 17—17 which runners extend for the full length of the pan and are substantially U-shaped having their ends secured to the end walls of the pan by welding or in any other suitable manner.

Obviously the runners 17 will maintain the bottom of the pan in spaced relation to the floor, or other surface over which the pan is being dragged thus preventing wear on the bottom of the pan.

Even though I have herein shown and described the preferred embodiment of my invention, it is to be understood that the same is susceptible to changes fully comprehended by the spirit of the invention as herein described, and the scope of the appended claims.

Having thus described my invention, what I claim as new is:

1. A portable drain pan comprising an elongated partially covered receptacle having portions of its cover sloping downwardly and inwardly from opposite side walls of the pan, and a rear portion of its cover sloping downwardly and inwardly from the rear wall of the pan, said cover at its free edge terminating inwardly and in spaced relation to the forward end of the pan, and a flange projecting inwardly from the rear wall of the pan in spaced parallel relation to the cover to provide a trough at the rear end of the pan, said pan at the forward end thereof provided with a pouring spout, and said pan having the forward corners thereof at the bottom beveled to provide a pair of inclined bottom surfaces for directing the contents of the pan toward said pouring spout, a handle pivotally secured at one end to the forward end of the pan whereby said handle may be utilized as a supporting leg for the pan when the latter is in an inclined position.

2. A portable drain pan comprising an elongated partially covered receptacle having portions of its cover sloping downwardly and inwardly from opposite side walls of the pan, and a rear portion of its cover sloping downwardly and inwardly from the rear wall of the pan, said cover at the free edge thereof terminating in spaced relation to the forward wall of the pan, said pan at the forward end thereof provided with a pouring spout, and said pan having the forward corners thereof at the bottom beveled to provide a pair of inclined bottom surfaces for directing the contents of the pan toward said pouring spout, a handle, means for pivotally securing one end of the handle to the forward end of the pan whereby said handle may be utilized as a supporting leg for the pan when the latter is in an inclined position, relatively flat spaced apart runners for the pan extending longitudinally of the latter for supporting the bottom of the pan in raised position from the floor or surface over which the pan may be moved.

In testimony whereof I affix my signature.

SENECA G. HOYT.